United States Patent
Osborn et al.

(10) Patent No.: US 8,910,177 B2
(45) Date of Patent: Dec. 9, 2014

(54) DYNAMIC MAPPING OF LOGICAL CORES

(75) Inventors: Michael J. Osborn, Hollis, NH (US);
Sebastien J. Nussbaum, Lexington, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 888 days.

(21) Appl. No.: 13/087,206

(22) Filed: Apr. 14, 2011

(65) Prior Publication Data
US 2012/0266179 A1 Oct. 18, 2012

(51) Int. Cl.
*G06F 9/50* (2006.01)
*G06F 9/455* (2006.01)

(52) U.S. Cl.
CPC ............ *G06F 9/5088* (2013.01); *G06F 9/5077* (2013.01)
USPC ............................. 718/105; 718/100; 712/220

(58) Field of Classification Search
None
See application file for complete search history.

(56) References Cited

U.S. PATENT DOCUMENTS

| | | |
|---|---|---|
| 2008/0134185 A1 | 6/2008 | Fedorova |
| 2008/0134191 A1 | 6/2008 | Warrier et al. |
| 2008/0148015 A1 | 6/2008 | Takamoto et al. |
| 2008/0168466 A1 | 7/2008 | Nitta et al. |
| 2008/0288123 A1 | 11/2008 | Krishnan et al. |
| 2009/0235108 A1 | 9/2009 | Gold et al. |
| 2010/0122101 A1 | 5/2010 | Naffziger et al. |
| 2010/0146513 A1 | 6/2010 | Song |
| 2010/0162256 A1 | 6/2010 | Branover et al. |

FOREIGN PATENT DOCUMENTS

WO    WO 2009027153 A1 *   3/2009

OTHER PUBLICATIONS

International Search Report and Written Opinion in Application No. PCT/US2012/033660 dated Jul. 5, 2012, 9 pages.

* cited by examiner

*Primary Examiner* — Qing Wu
(74) *Attorney, Agent, or Firm* — Meyertons, Hood, Kivlin, Kowert & Goetzel, P.C.

(57) ABSTRACT

A processor that dynamically remaps logical cores to physical cores is disclosed. In one embodiment, the processor includes a plurality of physical cores, and is configured to store a mapping of logical cores to the plurality of physical cores. The processor further includes an assignment unit configured to remap the logical cores to the plurality of physical cores subsequent to a boot process of the processor. In some embodiments, the assignment unit is configured to remap the logical cores in response to receiving an indication that one or more of the plurality of physical cores have entered an idle state. The processor may be configured to load a first of the plurality of physical cores with an execution state of a second of the plurality of physical cores upon the first physical core exiting an idle state.

20 Claims, 4 Drawing Sheets

DYNAMIC MAPPING OF LOGICAL CORES

BACKGROUND

1. Technical Field

This disclosure relates generally to processors, and, more specifically, to distributing workloads across multiple processor cores.

2. Description of the Related Art

Prolonging the longevity of integrated circuits is often an important design goal, as customers, in many instances, want circuits that can operate reliably for extensive periods and under significant stress. Developers thus attempt to account for a variety of factors that affect the lifetime of integrated circuits.

One important factor that affects the life expectancy of processors is the workload that a processor experiences over time. Processors that run for extensive periods under a high workload (such as processors used in server systems) may experience greater amounts of silicon stress tied to electromigration, dielectric breakdown, or thermally induced wear. These factors, in turn, may significantly shorten a processor's lifetime. Accordingly, reducing a processor's workload may be desirable, in some instances, to improve its life expectancy.

SUMMARY OF EMBODIMENTS

The present disclosure describes various embodiments of structures and methods to dynamically remap logical cores to physical cores.

In one embodiment, a processor is disclosed. The processor includes a plurality of physical cores, and is configured to store a mapping of logical cores to the plurality of physical cores. The processor further includes an assignment unit configured to remap the logical cores to the plurality of physical cores subsequent to a boot process of the processor.

In one embodiment, a method is disclosed. The method includes a plurality of physical cores on a processor performing a set of tasks, where the set of tasks are assigned based on a mapping of logical cores to the plurality of physical cores. The method further includes the processor remapping of the logical cores to the plurality of physical cores while an operating system is executing. An additional set of tasks are assigned based on the remapping.

In one embodiment, a computer readable storage medium is disclosed. The storage medium includes a data structure, which is operated upon by a program executable on a computer system. The program operating on the data structure is executable to perform a portion of a process to fabricate a processor including circuitry described by the data structure. The circuitry described by the data structure includes a plurality of physical cores. The processor is configured to store a mapping of logical cores to the plurality of physical cores. The circuitry also includes an assignment unit configured to remap the logical cores to the plurality of physical cores subsequent to a boot process of the processor.

DETAILED DESCRIPTION

Figure 1:
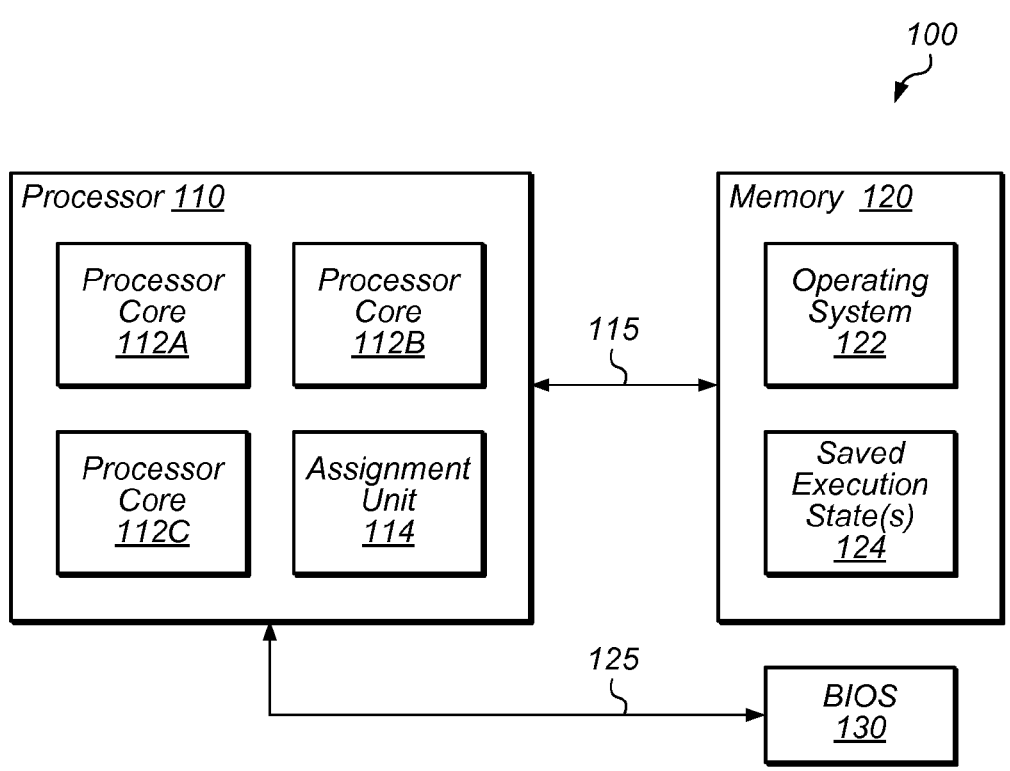
FIG. 1 is a block diagram illustrating one embodiment of a computer system that includes a multi-core processor configured to dynamically remap logical cores to physical cores.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Processor." This term has its ordinary and accepted meaning in the art, and includes a device that is capable of executing instructions. A processor may refer, without limitation, to a central processing unit (CPU), a co-processor, an arithmetic processing unit, a graphics processing unit, a digital signal processor (DSP), etc. A processor may be a superscalar processor with a single or multiple pipelines. A processor may include a single or multiple cores that are each configured to execute instructions.

"Physical core." This term has its ordinary and accepted meaning in the art, and includes a physical (i.e., tangible) circuit with a processor, where the circuit is configured to execute instructions. A processor may include multiple physical cores.

"Logical Core." This term has its ordinary and accepted meaning in the art, and includes an identifier that is associated with a physical core in a multi-core processor and that is used to assign tasks to that core. For example, in one embodiment, a task may specify that it be performed by a logical core L0 that is mapped to a physical core P0, instead of directly specifying that the task be performed on P0. If logical core L0 is subsequently remapped to another physical core P1, the task may now be performed on core P1. Accordingly, a "logical core" is an identifier for a core that may or may not correspond to the same physical core at different times.

"Boot Process." This term has its ordinary and accepted meaning in the art, and includes the process of initializing a computer system and loading an operating system for the computer system. A boot process may also include initializing I/O devices, testing memory, etc.

Most modern operating systems support the ability to distribute tasks to different processor cores in a multi-core processor based on the respective workloads of each core. For example, if a processor includes two processor cores and one core is operating under a heavy workload while the other is not, an operating system (or some other mechanism) may redistribute tasks between the processor cores. Redistributing tasks between cores can improve not only performance of tasks, but also a processor's life expectancy by reducing the chances that an overworked core will burn out early.

Obtaining an even distribution of workloads can be difficult because an operating system may allow certain tasks to be performed on only specific cores. For example, Timer Tick interrupts, which serve to set a real-time program cadence under certain operating systems, are directed to the logical bootstrap processor core, and cannot be distributed to other cores. Other examples include inter-processor interrupts that request a specific core to consistently handle a given application process (e.g., with an intent to improve affinity—i.e., the likely hood that a process may find the same cache memory access dataset already present in its cache) and IO-device interrupts that may be directed to specific cores through device programming. When a particular core is specified to perform several tasks in this manner, that core may have a higher workload than other cores, and thus, a shorter life expectancy.

Additionally recent advances in power management seek to raise the voltage and frequency of systems in which a single CPU core is active, to the highest voltage and frequency achievable within thermal limits. While this achieves increased performance, it further increases the silicon degradation rate."

There are several ways to mitigate the impact of silicon degradation over time. Typically, silicon degradation is modeled, using a set of workload and environmental operating conditions that are part of the chip specification. These assumptions are used to estimate the impact of silicon degradation over time, in particular the effect on transistor threshold voltage, saturation currents, and transition speed. This can be used to limit the performance assigned to the part, by guard-banding the operating frequency sufficiently against long-term damage. While this can cover some aspects of silicon degradation it does not cover thermally induced mechanical wear, requires limiting the peak performance of a system at launch, in relation to the guaranteed lifetime.

Some systems attempt to aggressively manage voltage and frequency of operation down during periods of idleness to reduce silicon stress. While this helps mitigate the problem, as typical systems can be expected to go through periods of high activity and low activity, it is only a partial solution, but can be used to reduce the operational frequency guard-band referred to in the previous paragraph.

Some systems attempt to mitigate this problem by mapping logical cores to physical cores and changing the mapping during the BIOS power-on self-test phase. For example, a processor having two physical cores P0 and P1 may map those cores respectively to logical cores L0 and L1 during a first boot. Tasks that specify logical core L0 may then be performed on physical core P0, and tasks that specify logical core L1 may then be performed on physical core P1. Upon a reset, the processor may remap logical cores L0 and L1 to physical cores P1 and P0, respectively. If logical core L0 generally has a heavier workload than L1, remapping the logical cores during each reset can cause the physical cores P0 and P1 to experience a better workload distribution over the life of the cores. Performing such a remapping during reset is relatively simple since the operating system is not yet loaded, and software cannot expect a specific core to handle the interrupt. The present disclosure recognizes that a problem with remapping logical cores in this manner is that reset events are typically infrequent for servers and, to some extent, desktops.

The present disclosure describes various techniques for dynamically remapping logical cores to physical cores. As will be described below, a multi-core processor may store a mapping of logical cores to a plurality of physical cores. This mapping may be used by an operating system, I/O devices, etc. to assign tasks to various ones of the physical cores. In one embodiment, the multi-core processor includes an assignment unit configured to remap the logical cores to the physical cores on a live system (i.e., subsequent to a boot process of the processor). For example, a first logical core may initially be mapped to a first physical core. Tasks addressed to the first logical core may then be assigned to the first physical core for performance. The assignment unit may then perform a remapping of the first logical core to a second one of the physical cores. As a result, tasks addressed to the first logical core may then be assigned to the second physical core for performance instead of the first physical core. If the first logical core typically has a higher workload than other logical cores, its higher workload, in many instances, can be distributed more-evenly across physical cores without having to reboot the processor.

Accordingly, the processor described herein, in many instances, is able to more frequently switch logical to physical core assignments than other processors that are not configured to perform dynamic remapping. In various embodiments, this more frequent remapping may result in a more-even distribution of workloads across cores irrespective of the OS, I/O, and system-device programming while still meeting functional architecture specification. As a result, the processor may experience reduced silicon stress on a single compute entity and have a lengthened overall lifetime. Increasing silicon life may also translate into additional reliability and performance upside as the operational frequency guard-band for silicon degradation can be reduced. Additionally, silicon stress testing per part at manufacturing (usually referred to as "burn-in" test) can be more limited since the risk is reduced—this reduces manufacturing costs.

Turning now to FIG. 1, a block diagram of one embodiment of a computer system 100 is depicted. In the illustrated embodiment, computer system 100 includes a processor 110, a memory 120, and a basic input/output system (BIOS) 130. Processor 110 includes processor cores 112A-C (in some embodiments, processor 110 may include more or less cores 112 than shown) and an assignment unit 114. Processor 110 is coupled to memory 120 via interconnect 115 and to BIOS 130 via interconnect 125. In the illustrated embodiment, memory 120 is configured to store operating system 122 and one or more saved execution states 124.

Processor 110 may be any suitable type of multi-core processor. Processor 110 may be a general-purpose processor such as a central processing unit (CPU). Processor 110 may be a special-purpose processor such as an accelerated processing unit (APU), digital signal processor (DSP), graphics processing unit (GPU), etc. Processor 110 may be acceleration logic such as an application-specific integrated circuit (ASIC), field-programmable gate array (FPGA), etc. Processor 110 may be a multi-threaded superscalar processor.

Memory 120 may be any suitable type of memory. Memory 120 may be implemented using different physical memory media, such as hard disk storage, floppy disk storage, removable disk storage, flash memory, random access memory (RAM—static RAM (SRAM), extended data out (EDO) RAM, synchronous dynamic RAM (SDRAM), double data rate (DDR) SDRAM, RAMBUS RAM, etc.), read only memory (ROM—programmable ROM (PROM), electrically erasable programmable ROM (EEPROM), etc.), and so on.

BIOS 130 is one embodiment of a basic input/output system that is configured to a perform boot process of processor 110. In various embodiments, this boot process may include identifying and initializing I/O devices in computer system 100 such as a video card, mouse, keyboard, etc. This boot process may include testing the integrity of devices in memory 120. In one embodiment, BIOS 130 may conclude the boot process by loading operating system 122 from permanent storage into RAM in memory 120 and causing processor 110 to begin execution of operating system 122. As will be described below, in various embodiments, assignment unit 114 is configured to remap logical cores to cores 112 after BIOS 130 has completed performing the boot process of processor 110.

Processor cores 112 are one embodiment of physical cores, which are configured to execute instructions to perform one or more tasks. In various embodiments, these tasks may be assigned by operating system 122 (e.g., to process a time ticker interrupt). These tasks may be assigned by other cores 112 (e.g., to process an inter-processor interrupt (IPI)). These tasks may be assigned by I/O devices (e.g., to service a received input). As noted above, in various embodiments, some tasks may be assigned based on a mapping of logical cores to physical cores 112. For example, operating system 122 may assign a particular task to a first logical core L0, which may correspond to a bootstrap processor in one embodiment. If logical core L0 is currently mapped to processor 112A, processor 112A may then perform the task. If, however, logical core L0 is mapped to processor 112B, processor 112B may perform the task instead.

In some embodiments, cores 112 may be configured to operate at different operating states, which are predefined by processor 110 and may include different power states and different performance states. In some embodiments, these power states and/or performance states correspond respectively to "C" and "P" states defined by the advanced configuration and power interface (ACPI) standard. A performance state is a state in which a core 112 is executing instructions at a particular voltage/frequency. For example, in one embodiment, if significant processing demands exist, a core 112 may operate at its highest performance state, which may be referred to as performance state P0. In such an embodiment, P0 corresponds to a maximum operating frequency and highest power setting of a core 112. If lesser demands exist, a core 112 may operate at a lower performance state (e.g., performance state P1, P2, etc.), where a core 112 operates at lower operating frequencies and lower power settings. A power state may indicate, for example, whether a core 112 is fully operational, or is powered down in whole or part. For example, in one embodiment, if some processing demand for a core 112 exists, the core 112 may operate at a power state that permits execution of instructions; such a state may be referred to as power state C0. If little or no demand for a core 112 exists, the core 112, in one embodiment, may operate at a lower power state such as a halted state or a stop-clock state; such states may be referred to as power states C1 or C2 respectively. Thus, a power state may refer to a state in which a core 112 is fully operational (i.e., executing instructions) or one of plurality of different idle states in which a core 112 is not executing instructions.

In one embodiment, each core 112 is configured to store its execution state 124 (not to be confused with a core's operating state described above) to memory 120 upon entering an idle state. In various embodiments, saved execution states 124 of cores 112 may include the contents of registers, program counters, stack pointers, etc. Saved execution states 124 may also include contents of instructions caches (I-caches), contents of data caches (D-caches), translation-lookaside-buffer (TLB) information, etc. In one embodiment, when a core 112 exits an idle state, the core 112 is configured to reload its execution state 124 and resume execution instructions using the reloaded state 124. As will be described below, in some embodiments, a core 112 may be configured to load the saved state 124 of another core 112 in response to a remapping of logical cores to physical cores.

Assignment unit 114, in one embodiment, is configured to generate a mapping of logical cores to physical cores 112 (i.e., a logical-core mapping) and to perform a dynamic remapping of the logical cores to physical cores 112. As used herein, a dynamic remapping refers to a remapping that is performed after BIOS 130 has performed a boot process for processor 110. Said another way, assign unit 114, in one embodiment, is configured to remap logical cores to physical cores 112 after operating system 122 has been loaded and is executing. In the illustrated embodiment, assignment unit 114 is located in processor 110 but not within a particular core 112. In some embodiments, assign unit 114 may be located in within a core 112 or distributed among multiple cores 112 (i.e., cores 112 may perform the operations of assignment unit 114). In some embodiments, assignment unit 114 may be located within north bridge logic of processor 110. In some embodiments, assignment unit 114 may be located external to processor 110 such as within BIOS 130. In some embodiments, operations described as being performed by assignment unit 114 may be divided among multiple blocks within computer system 100.

In one embodiment, processor 110 is configured to transfer the execution state of a core 112 to another core 112 upon assignment unit 114 remapping a different logical core to that core 112. For example, if core 112A is assigned to logical core L0, processor 110 may transfer the state of core 112A to core 112B upon L0 being remapped to core 112B. In one embodiment, processor 110 is configured to transfer execution states between cores 112 via an interconnect between cores 112. In one embodiment, processor 110 may be configured to transfer an execution state by storing that state to memory 120 (as a state 124) and then reloading that state onto another core 112. In some embodiments, processor 110 is configured to store and reload execution states when cores 112 enter and exit an idle power state (such as described above). As will be described below, processor 110, in one embodiment, may be configured to cause one or more cores 112 to enter and exit an idle state in response to assignment unit 114 performing a remapping. Alternatively, assignment unit 114 may be configured to perform a remapping upon one or more cores 112 transitioning to or from an idle state. In various embodiments, processor 110 may be configured to transfer execution states without operating system or software knowledge.

Assignment unit 114 is described next in conjunction with FIG. 2.

Figure 2:
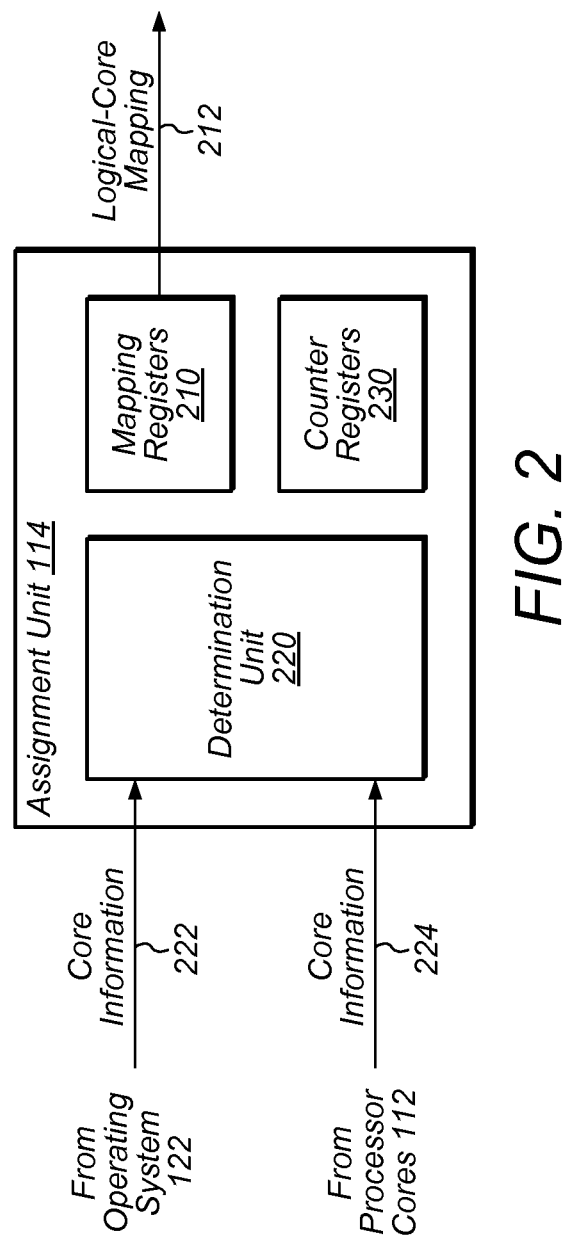
FIG. 2 is a block diagram illustrating one embodiment of an assignment unit that may be included in the multi-core processor.

Turning now to FIG. 2, one embodiment of assignment unit 114 is depicted. In the illustrated embodiment, assignment unit 114 includes mapping registers 210, determination unit 220, and counter registers 230. It is noted that, although units 210-230 are shown within a single unit 114, in some embodiments, units 210-230 may be dispersed among units in computer system 100.

Mapping registers 210, in one embodiment, are configured to store identifiers representative of a mapping of logical cores to physical cores (shown as a logical-core mapping 212). In some embodiments, registers 210 may include a respective register for each core 112, and that a respective register 210 may be configured to store the logical core mapped to that core 112. Accordingly, registers 210 may include a first register that stores the logical core assigned to core 112A, a second register that stores the logical core assigned to core 112B, and so on. In various embodiments, operating system 122, cores 112, I/O devices, etc. may be configured to read a logical mapping 212 from registers 210 to determine where to assign tasks (i.e., which ones of cores 112 are to perform the tasks).

Determination unit 220, in one embodiment, is configured to identify when a remapping of logical cores to physical cores is to be performed, and to determine the logical-core remapping. Determination unit 220 may base the decision of when to perform a remapping on any of a variety of suitable conditions. In one embodiment, determination unit 220 is configured to perform a remapping in response to receiving an indication that one or more cores 112 have entered an idle state. As noted above, processor 110 may transfer the execution state 124 of one core 112 to another core 112 during a remapping. In some embodiments, processor 110 is configured to perform this transfer, by causing a core 112 to load the execution state 124 of another core 112 upon exiting an idle state. By performing a remapping after a core 112 has entered an idle state, processor 110, in one embodiment, can transfer the state of one core 112 to another without forcing that core 112 to enter an idle state since it is already there. In one embodiment, determination unit 220 is configured to perform a remapping at regular intervals (e.g., after determining that a particular amount of time has passed since the previous remapping). In such an embodiment, assignment unit 114 may be configured to cause one or more core 112 to enter and exit an idle state to facilitate the transfer of executions states 124 during the remapping. In other embodiments, assignment unit 114 may be configured to use other techniques to facilitate the transfer of execution state such as those described above. In one embodiment, determination unit 220 is configured to perform a remapping based on determined workloads for cores 112. For example, determination unit 220 may be configured to perform a remapping after determining a particular core 112's workload has exceeded a threshold value (e.g., core 112A has been operating in a particular performance state for a particular amount of time). In the illustrated embodiment, determination unit 220 is configured to determine whether to perform a remapping based on based on core information 222 received from operating system 122 and/or core information 224 received from cores 112. As will be described below in conjunction with FIG. 3, such information may include operating state information indicative of power and/or performance states for cores 112, temperature information specifying temperatures for cores 112, etc.

Determination unit 220 may also determine the logical-core remapping based on any of a variety of suitable criteria. In one embodiment, determination unit 220 is configured to remap logical cores based on a predetermined ordering of physical cores 112. For example, determination unit 220 may initially map a logical core to an initial physical core 112 (e.g., core 112A) and then remap logical core to the next physical core 112 in the ordering (e.g., core 112B). In another embodiment, determination unit 220 may be configured to assign logical cores to physical cores 112 based on a randomly generated sequence. In some embodiments, determination unit 220 may be configured to determine a remapping based on received information 222 and/or 224. As will be described below, in one embodiment, determination unit 220 may be configured to determine a remapping based on operating states of one or more cores 112. In one embodiment, determination unit 220 may be configured to determine a remapping based on temperatures measured from one or more cores 112. In some embodiments, determination unit 220 is configured to determine a logical-core remapping based on a composite of operating-state information and temperature information for cores 112. In various embodiments, determination unit 220 may be configured to determine whether to remap some or all of the logical cores to physical cores. For example, determination unit 220 may initially determine to remap only a subset of logical cores (e.g., based on temperature information for cores 112) and subsequently determine to remap all of cores 112 (e.g., based on the current workloads of cores 112).

Counter registers 230, in one embodiment, are configured to store information usable by determination unit 220 in determining whether to perform a logical-core remapping. In one embodiment, counter registers 230 are configured to a value indicative of the time that has passed since the last mapping or remapping. In one embodiment, counter registers 230 are configured to store a value for each core 112 indicative of how long a core 112 has been operating at a particular power and/or performance state. For example, a register 230 may store a value that specifies that core 112A has been operating in an overclock performance state for the last N seconds. In one embodiment, counter registers 230 are configured to store a value for each core 112 indicative of how long a core 112 has been operating at a temperature above a particular threshold temperature.

Figure 3:
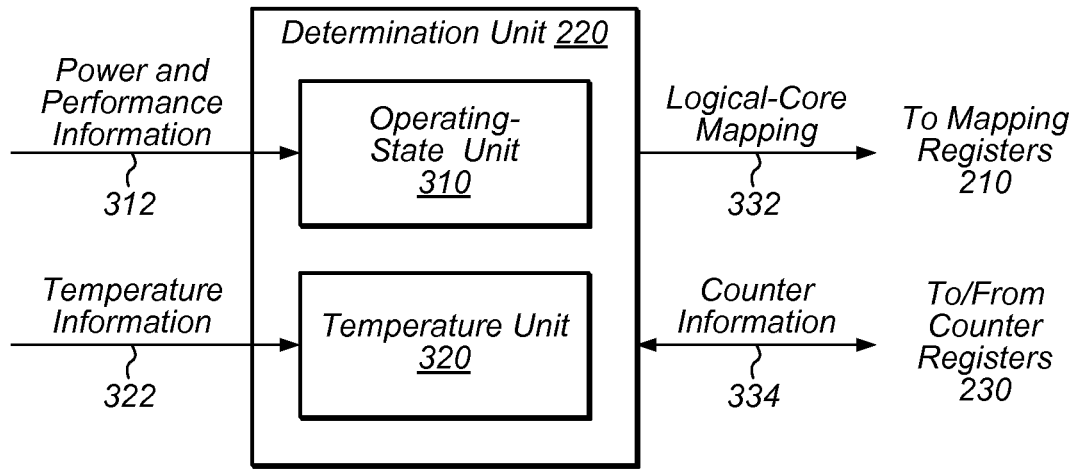
FIG. 3 is a block diagram illustrating one embodiment of a determination unit that may be included in the assignment unit.

Turning now to FIG. 3, a block diagram of determination unit 220 is depicted. As noted above, in various embodiments, determination unit 220 is configured to identify when to perform a remapping, and to determine the remapping. In the illustrated embodiment, determination unit 220 includes an operating-state unit 310 and a temperature unit 320.

Operating-state unit 310, in one embodiment, is configured to process power and performance information 312 for determination unit 220. In various embodiments, information 312 includes indications of power states and performance states for each core 112. Information 312 may also include an indication specifying when a core 112 is transitioning from one state to another (e.g., specifying that core 112A is transitioning from performance state P1 to performance state P0). In one embodiment, operating-state unit 310 is configured to receive information 312 from operating system 122. In another embodiment, operating-state unit 310 may be configured to receive information from cores 112 directly. In some embodiments, operating-state unit 310 is configured to store and retrieve information (shown as counter information 332) associated with information 312 in counter registers 230.

In one embodiment, operating-state unit 310 is configured to use processed information 312 to assist determination unit 220 in determining whether to create a new logical-core mapping 332. In some embodiments, operating-state unit 310 is configured to cause a logical-core remapping in response to one or more cores 112 transitioning to new operating states. For example, in one embodiment, operating-state unit 310 is configured to cause a remapping in response to at least one core 112 entering an idle state. As noted above, in some embodiments, a core 112 may be configured to store its execution state 124 upon entering the idle state and may reload the execution state 124 of another core 112 upon exiting the idle state after a remapping. In some embodiments, operating-state unit 310 is configured to cause a remapping based on how long a core 112 has been in a particular performance state or power state. For example, operating-state unit 310 may be configured to cause a remapping upon determining that a particular core 112 has been at a high performance state (e.g., P0) for more than a specified time. Similarly, operating-state unit 310 may be configured to cause a remapping upon determining that a particular core 112 has been operating in an overclock state for more than a specified time. In some embodiments, operating-state unit 310 may be configured to compute a workload score for each core 112 based on the operating state of that core and the time spent at that state. Operating-state unit 310 may be configured to then cause a remapping if individual scores exceed a threshold value or if the total of the scores exceeds a total threshold. In some embodiments, such scores may be combined with scores generated by temperature unit 320 (described below) to determine when remapping should be performed.

In one embodiment, operating-state unit 310 is further configured to use processed information 312 to assist determination unit 220 in determining the logical-core mapping 332. In one embodiment, operating-state unit 310 is configured to cause determination unit 220 to remap logical cores to physical cores 112 that are operating in an idle state, and to not remap logical cores for physical cores 112 that are not operating in an idle state. In one embodiment, operating-state unit 310 is configured to cause determination unit 220 to remap logical-cores from cores 112 at higher operating states to cores 112 at lower operating states. In one embodiment, operating-state unit 310 is configured to cause determination unit 220 to remap logical cores to cores 112 that have been at a higher operating state for longer periods before remapping logical cores to cores 112 that have been at those states for lesser periods.

Temperature unit 320, in one embodiment, is configured to process temperature information 322 for determination unit 220. In various embodiments, information 322 includes one or more temperatures collected throughout processor 110. In one embodiment, temperature unit 320 is configured to receive information 322 from multiple sensors located on cores 112. In some embodiments, temperature unit 320 may be configured to store and retrieve information 332 associated with information 322 in counter registers 320.

In one embodiment, temperature unit 320 is configured to use processed information 322 to assist determination unit 220 in determining whether to create a new logical-core mapping 332. In some embodiments, temperature unit 320 may be configured to cause determination unit 220 to perform a logical-core remapping in response to determining that a core 112 has exceeded a maximum temperature threshold. In one embodiment, temperature unit 320 may be configured to determine whether a core 112 exceeds a threshold temperature and, if so, how long that core 112 has exceeded that temperature. After the core 112 has exceeded the temperature for a specified period, temperature unit 320 may be configured to then cause a logical-core remapping. In one embodiment, temperature unit 320 may be configured to compute a workload score for each core 112 based on the temperatures collected from cores 112 and the time spent at those temperatures. Temperature unit 320 may be configured to then cause a remapping if those scores exceed a threshold value. In some embodiments, such scores may be combined with scores generated by operating-state unit 310 to determine when a remapping should be performed.

In one embodiment, temperature unit 320 is further configured to use processed information 322 to assist determination unit 220 in determining a logical-core mapping 332. In one embodiment, temperature unit 320 is configured to cause determination unit 220 to remap the logical-cores from cores 112 operating at higher temperatures to cores 112 operating at lower temperatures. In one embodiment, temperature unit 320 may be configured to cause determination unit 220 to remap logical cores to cores 112 operating at higher temperatures for longer periods before remapping logical cores to cores 112 operating at similar temperatures for lesser periods.

Figure 4:
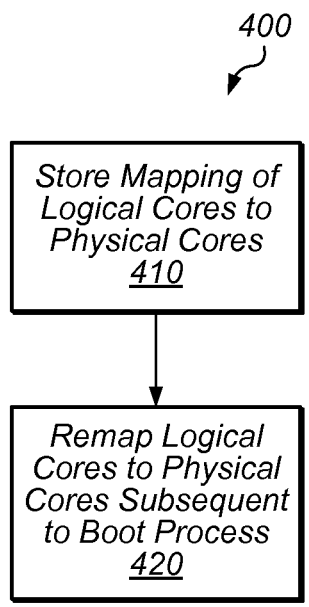
FIG. 4 is a flow diagram illustrating one embodiment of a method for dynamically remapping logical cores to physical cores.

Turning now to FIG. 4, a flow diagram of a method 400 for dynamically remapping logical cores is depicted. Method 400 is one embodiment of a method that may be performed by a multi-core processor, such as processor 110. In various embodiments, method 400 may be performed multiple times to perform subsequent remappings. In some instances, performing method 400 may produce a better distribution of workloads among processor cores, which, in turn, can improve the lifetime of a processor.

In step 410, processor 110 stores a mapping of logical cores to physical cores. As discussed above, in various embodiments, this mapping may be used by an operating system, other cores, I/O devices, etc. to assign tasks to physical cores (e.g., cores 112) for performance. In one embodiment, processor 110 stores the mapping in a set of registers (e.g., registers 230) of an assignment unit (e.g., assignment unit 114). In other embodiments, processor 110 stores the mapping elsewhere such as within a memory (e.g., memory 120), a BIOS (e.g., BIOS 130), etc. In some instances, the stored mapping may be an initial mapping generated, for example, during a boot process of a computer system (e.g., system 100). In other instances, the stored mapping may be a mapping generated during a previously performed remapping.

In step 420, processor 110 (e.g., using assignment unit 114) remaps logical cores to physical cores subsequent to a boot process. This remapping may then be used, in various embodiments, to assign subsequent tasks to physical cores for performance. As discussed above, processor 110 (e.g., using determination unit 220) may identify when to perform the remapping based on any of a variety of conditions. In one embodiment, processor 110 may perform a remapping at regular intervals. In some embodiments, processor 110 may determine to perform a remapping based on one or more operating states of physical cores. For example, in one embodiment, processor 110 may determine to perform a remapping in response to one or more cores entering an idle state. In some embodiments, processor 110 may determine to perform a remapping based on temperature information collected from the cores.

As discussed above, processor 110 may determine the remapping based on any of variety of suitable criteria. In one embodiment, processor 110 may remap logical cores to physical cores based on a predetermined ordering of the physical cores. For example, if logical core L0 is assigned to physical core P0 and physical core P1 is next in the ordering after P0, logical core L0 may then be remapped to core P1. In some embodiments, processor 110 may determine the remapping based on operating states of the cores. For example, in one embodiment, processor 110 may remap logical cores from physical cores at higher operating states (e.g., a physical core at a performance state P0) to physical cores at lower operating states (e.g., a physical core at a performance state P1). In some embodiments, processor 110 may determine the remapping based on temperatures measured from the physical cores. For example, in one embodiment, processor 110 may remap logical cores from physical cores operating at higher temperatures to physical cores operating at lower temperatures.

In various embodiments, processor 110 transfers the execution states between physical cores in response to the remapping. As discussed above, in some embodiments, processor 110 transfers an execution state from a first core to a second core by storing the execution state to memory and then reloading the execution state on the second core. In one embodiment, processor 110 performs the storing by causing the first core to enter an idle state in which the core stores its execution state to memory. Processor 110 may perform the reloading by causing the second core to exit the idle state and reload the execution state.

Exemplary Computer System

Figure 5:
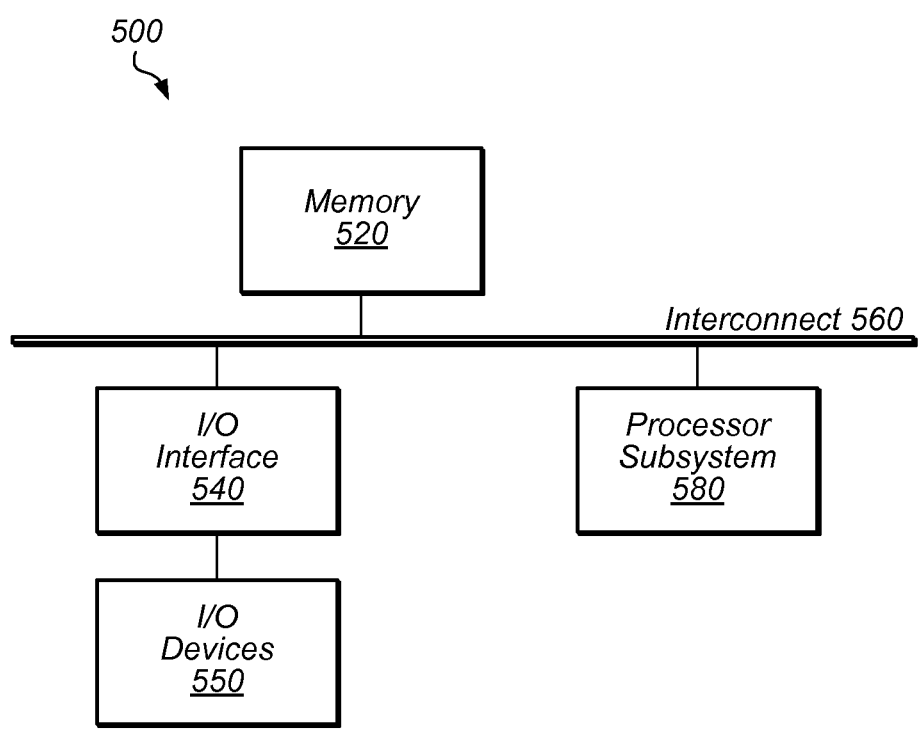
FIG. 5 is a block diagram illustrating one embodiment of an exemplary computer system.

Turning now to FIG. 5, one embodiment of an exemplary computer system 500, which may include processor 110, is depicted. Computer system 500 includes a processor subsystem 580 that is coupled to a system memory 520 and I/O interfaces(s) 540 via an interconnect 560 (e.g., a system bus). I/O interface(s) 540 is coupled to one or more I/O devices 550. Computer system 500 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Computer system 500 may also be any type of networked peripheral device such as storage devices, switches, modems, routers, etc. Although a single computer system 500 is shown for convenience, system 500 may also be implemented as two or more computer systems operating together.

Processor subsystem 580 may include one or more processors or processing units. For example, processor subsystem 580 may include one or more processing units (each of which may have multiple processing elements or cores) that are coupled to one or more resource control processing elements 520. In various embodiments of computer system 500, multiple instances of processor subsystem 580 may be coupled to interconnect 560. In various embodiments, processor subsystem 580 (or each processor unit or processing element within 580) may contain a cache or other form of on-board memory. In one embodiment, processor subsystem 580 may include processor 110 described above.

System memory 520 is usable by processor subsystem 580. System memory 520 may be implemented using different physical memory media, such as hard disk storage, floppy disk storage, removable disk storage, flash memory, random access memory (RAM—static RAM (SRAM), extended data out (EDO) RAM, synchronous dynamic RAM (SDRAM), double data rate (DDR) SDRAM, RAMBUS RAM, etc.), read only memory (ROM—programmable ROM (PROM), electrically erasable programmable ROM (EEPROM), etc.), and so on. Memory in computer system 500 is not limited to primary storage such as memory 520. Rather, computer system 500 may also include other forms of storage such as cache memory in processor subsystem 580 and secondary storage on I/O Devices 550 (e.g., a hard drive, storage array, etc.). In some embodiments, these other forms of storage may also store program instructions executable by processor subsystem 580.

I/O interfaces 540 may be any of various types of interfaces configured to couple to and communicate with other devices, according to various embodiments. In one embodiment, I/O interface 540 is a bridge chip (e.g., Southbridge) from a front-side to one or more back-side buses. I/O interfaces 540 may be coupled to one or more I/O devices 550 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 500 is coupled to a network via a network interface device.

Program instructions that are executed by computer systems (e.g., computer system 500) may be stored on various forms of computer readable storage media. Generally speaking, a computer readable storage medium may include any non-transitory/tangible storage media readable by a computer to provide instructions and/or data to the computer. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In some embodiments, a computer-readable storage medium can be used to store instructions read by a program and used, directly or indirectly, to fabricate hardware for processor 110 described above. For example, the instructions may outline one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 110. The netlist may then be placed and routed to produce a data set describing geometric shapes to be applied to masks. The masks may then be used in various semiconductor fabrication steps to produce a semiconductor circuit or circuits corresponding to processor 110.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor, comprising:
    a plurality of physical cores, wherein the processor is configured to store a mapping of logical cores to the plurality of physical cores, wherein the mapping is usable by an operating system to assign tasks to the plurality of physical cores; and
    an assignment unit configured to remap the logical cores to the plurality of physical cores subsequent to a boot process of the processor.

2. The processor of claim 1, wherein the assignment unit is configured to receive an indication that one or more of the plurality of physical cores have entered an idle state, and wherein the assignment unit is configured to remap the logical cores in response to receiving the indication.

3. The processor of claim 2, wherein the processor is configured to store an execution state of a first of the plurality of physical cores responsive to the first physical core entering the idle state, and wherein the processor is configured to load the first physical core with an execution state of a second of the plurality of physical cores responsive to the first physical core exiting the idle state.

4. The processor of claim 1, wherein the assignment unit is configured to determine an amount of time that has elapsed since performing a previous remapping of the logical cores, and wherein the assignment unit is configured to remap the logical cores in response to the amount of time exceeding a threshold value.

5. The processor of claim 1, wherein the assignment unit is configured to determine a respective workload of one or more of the plurality of physical cores, and wherein the assignment unit is configured to remap one or more of the logical cores to one or more of the plurality of physical cores based on the one or more determined workloads.

6. The processor of claim 1, wherein the assignment unit is configured to receive temperature information for one or more of the plurality of physical cores, and wherein the assignment unit is configured to remap one or more of the logical cores to one or more of the plurality of physical cores based on the received temperature information.

7. The processor of claim 1, wherein the processor is configured to store an execution state of a first of the plurality of physical cores and an execution state of a second of the plurality of physical cores, and wherein the processor is configured to load the first physical core with the stored execution state of the second physical core and the second physical core with the stored execution state of the first physical core in response to the assignment unit remapping logical cores mapped to the first and second physical cores.

8. The processor of claim 1, wherein the processor is configured to overclock one of the plurality of physical cores, and wherein the assignment unit is configured to remap a logical core to the overclocked physical core based on a length of time that the physical core has been overclocked.

9. The processor of claim 1, wherein the assignment unit is configured to perform a remapping of a subset of the logical cores to ones of the plurality of physical cores without remapping all of the logical cores.

10. A method, comprising:
    a plurality of physical cores on a processor performing a set of tasks, wherein the set of tasks are assigned based on a mapping of logical cores to the plurality of physical cores; and
    an assignment circuit within the processor remapping the logical cores to the plurality of physical cores while an operating system is executing, wherein an additional set of tasks are assigned based on the remapping.

11. The method of claim 10, further comprising:
    the processor transferring a current execution state from a first of the plurality of physical cores to a second of the plurality of physical cores in response to a logical core being remapped from the first physical core to the second physical core.

12. The method of claim 11, wherein the transferring includes storing the execution state to a memory coupled to the processor and reloading the execution state on the second physical core.

13. The method of claim 12, wherein the transferring includes the second physical core exiting an idle state to reload the execution state of the first physical core.

14. The method of claim 10, wherein the processor determines the remapping based on a respective performance state of ones of the plurality of physical cores.

15. The method of claim 14, wherein the remapping includes remapping a logical core from a first physical core at a higher performance state to a second physical core at a lower performance state.

16. The method of claim 10, wherein the processor determines the remapping based on one or more temperatures collected from the plurality of physical cores.

17. The method of claim 10, further comprising:
    the processor performing a remapping of the logical cores to the plurality of physical cores at regular intervals.

18. A non-transitory computer readable medium comprising a data structure which is operated upon by a program executable on a computer system, the program operating on the data structure to perform a portion of a process to fabricate a processor including circuitry described by the data structure, the circuitry described by the data structure including:
    a plurality of physical cores, wherein the processor is configured to store a mapping of logical cores to the plurality of physical cores; and
    an assignment unit configured to remap the logical cores to the plurality of physical cores subsequent to a boot process of the processor.

19. The computer readable medium of 18, wherein the processor is configured to store an execution state from a first of the plurality of physical cores in a memory and to load the execution state on a second of the plurality of physical cores in response to a logical core being remapped from the first physical core to the second physical core.

20. The computer readable medium of 18, wherein the storage medium stores hardware description language (HDL) data, Verilog data, or graphic database system II (GDSII) data.

* * * * *